UNITED STATES PATENT OFFICE.

OSCAR GÜNTHER AND LEOPOLD HESSE, OF ELBERFELD, ARTHUR ZART, OF VOHWINKEL, AND HUGO SCHWEITZER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYESTUFF.

982,954. Specification of Letters Patent. Patented Jan. 31, 1911.

No Drawing. Application filed June 29, 1910. Serial No. 569,489.

*To all whom it may concern:*

Be it known that we, OSCAR GÜNTHER and LEOPOLD HESSE, residing at Elberfeld, and ARTHUR ZART and HUGO SCHWEITZER, residing, respectively, at Vohwinkel, near Elberfeld, and Elberfeld, Germany, doctors of philosophy, chemists, citizens of the German Empire, have invented new and useful Improvements in Dyes, of which the following is a specification.

This invention relates to the preparation of new azo dyestuffs which are obtained by combining in acid solution the diazo compounds of aromatic amins containing no nitro groups, especially anilin, ortho-chloroanilin, naphthylamins, toluidins, xylidins, aminophenol ethers, aminobenzaldehyds, anthranilic acids etc., with 2-arylamino-8-naphthol-6-sulfonic acids.

The new dyestuffs are after being dried and pulverized in the shape of their alkaline salts dark powders; yielding upon reduction with stannous chlorid and hydrochloric acid an aromatic amin containing no nitro group and an 1-amino-3-arylamino-8-naphthol-6-sulfonic acid. They produce on wool from an acid bath from red to violet shades of good fastness to light and to milling. Part of the dyes can be increased in fastness by chroming.

In order to illustrate the new process more fully the following example is given, the parts being by weight:—127.5 parts of ortho-chloro-anilin are diazotized and the resulting diazo compound is then added at 3° C. to a slightly acid (Congo acid) suspension, which has to be stirred of 345 parts of 2-para-anisidylamino-8-naphthol-6-sulfonic acid. After the combination is complete the dyestuff is converted into its sodium salt, filtered off and dried. It is after being dried and pulverized in the shape of its sodium salt a black-brown powder soluble in concentrated sulfuric acid with a violet-blue color; yielding upon reduction with stannous chlorid and hydrochloric acid ortho-chloro-anilin and 1-amino-2-para-anisidylamino-8-naphthol-6-sulfonic acid; and dyeing wool from an acid bath a bluish-red fast to light and to milling. Similar shades are obtained on using instead of 2-para-anisidylamino-8-naphthol-6-sulfonic acid, other of the above mentioned derivatives of 2-amino-8-naphthol-6-sulfonic acid *e. g.* paratolyl-, xylyl-, ortho-anisidyl-, phenyl-, meta-carboxyphenyl-2-amino-8-naphthol-6-sulfonic acid or on using instead of the above mentioned diazo compound diazo compounds of other of the above mentioned amins.

We claim:

1. The herein described new azo dyestuffs obtainable from amins and 2-arylamino-8-naphthol-6-sulfonic acids, which are after being dried and pulverized in the shape of their alkaline salts dark powders; yielding upon reduction with stannous chlorid and hydrochloric acid an unnitrated amin and an 1-amino-2-arylamino-8-naphthol-6-sulfonic acid; and dyeing wool from red to violet shades, substantially as described.

2. The herein described new azo dyestuff obtainable from ortho-chloroanilin and 2-para-anisidylamino-8-naphthol-6-sulfonic acid, which dye is after being dried and pulverized in the shape of its sodium salt a black-brown powder soluble in concentrated sulfuric acid with a violet-blue color; yielding upon reduction with stannous chlorid and hydrochloric acid ortho-chloroanilin and 1-amino-2-para-anisidylamino-8-naphthol-6-sulfonic acid; and dyeing wool bluish-red shades, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]
HUGO SCHWEITZER. [L. S.]

Witnesses:
CHAS. J. WRIGHT,
W. DONNEGUT.